April 18, 1933. W. F. RICHARDS 1,904,535
PULLEY AND MOUNTING THEREFOR
Filed April 19, 1929 2 Sheets-Sheet 1

Inventor,
Willard F. Richards,
by Walter P. Geyer
Attorney.

April 18, 1933. W. F. RICHARDS 1,904,535
PULLEY AND MOUNTING THEREFOR
Filed April 19, 1929   2 Sheets-Sheet 2

Inventor,
Willard F. Richards,
by Walter P. Guyer
Attorney.

Patented Apr. 18, 1933

1,904,535

UNITED STATES PATENT OFFICE

WILLARD F. RICHARDS, OF DEPEW, NEW YORK

PULLEY AND MOUNTING THEREFOR

Application filed April 19, 1929. Serial No. 356,343.

This invention relates to a belt pulley and mounting therefor and has been designed more particularly for use in connection with the driving mechanism of railway car generators.

Its chief object is to provide simple and reliable means for fastening the pulley on the axle with a view of obtaining greater rigidity and security and eliminating any danger of slippage of the pulley on the axle.

A further object of the invention is to so construct the pulley that it is substantially braced relatively to the hub and whose rim or belt-engaging surface is shiftable to one side or the other of the hub for the purpose of centering the same or lining it up with the pulley of the generator.

Other features of the invention reside in the construction and arrangement of parts hereinafter described and particularly pointed out in the claims.

In the accompanying drawings:—

Figure 1:
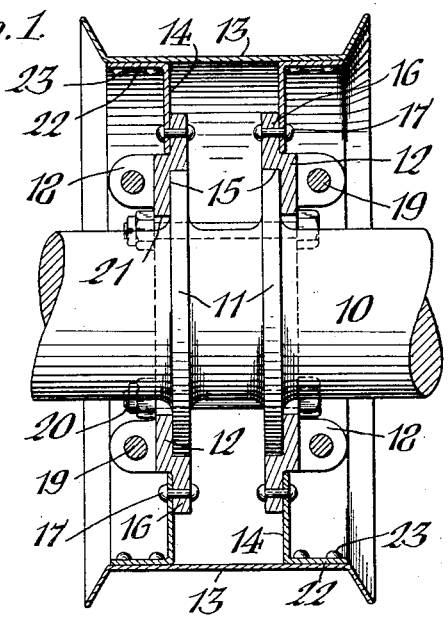
Figure 2:
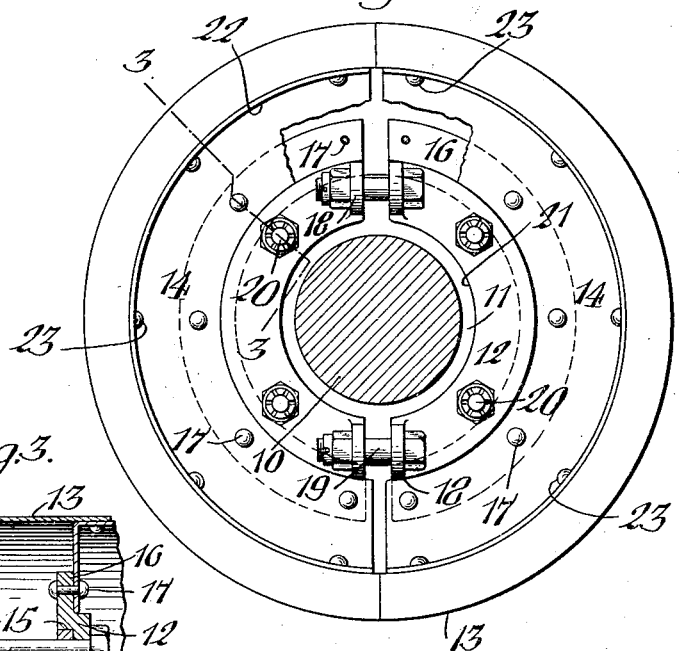
Figure 3:
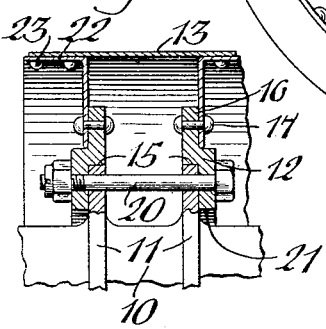
Figure 4:
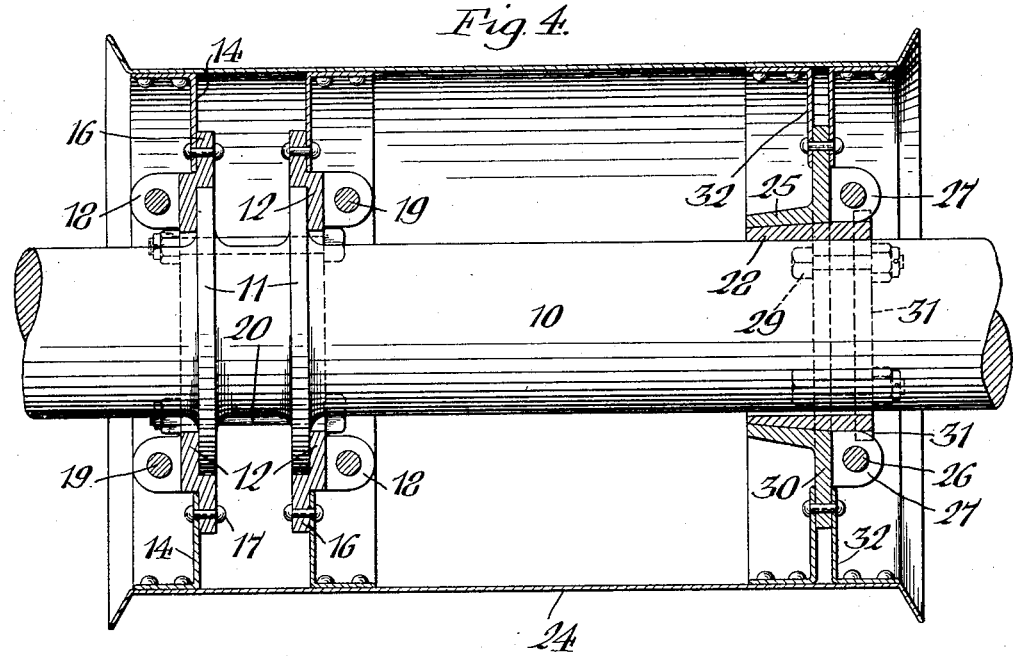
Figure 5:
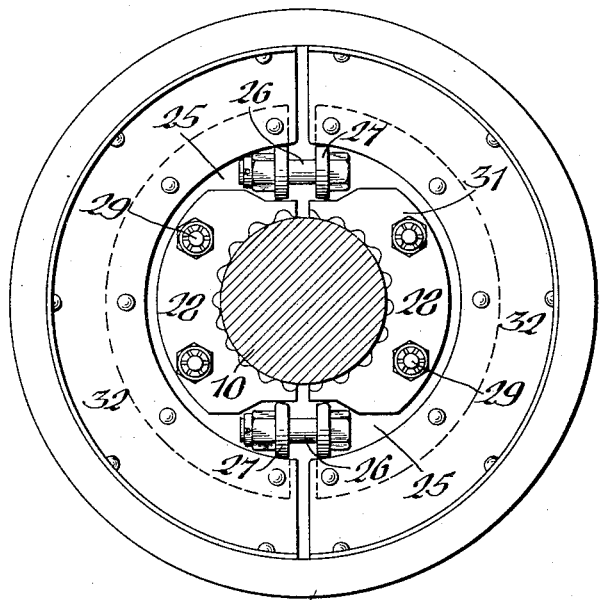

Figure 1 is a transverse section of a pulley constructed in accordance with my invention and applied to the axle of a railway car. Figure 2 is an end view of the pulley, partly in section. Figure 3 is a fragmentary cross section taken on line 3—3, Figure 2. Figure 4 is a transverse section showing my invention applied to a drum type of pulley. Figure 5 is an end view thereof.

Similarly characters of reference indicate corresponding parts throughout the several views.

While my improved pulley and its mounting may be used for different purposes, it has been designed more particularly for use in connection with the driving mechanism of railway car generators, which are usually mounted on the underside of the car and are connected by a belt with a pulley mounted on the car-axle.

Referring now to the drawings, 10 indicates the car-axle which is provided with one or more attaching members, collars or flanges 11 preferably forged integrally with the axle. As shown in Figure 1, two of such flanges are shown suitably spaced lengthwise of the axle and serve as a means for securely attaching the pulley to the axle.

The improved pulley is composed of two half sections to permit its ready application and removal to and from the axle without dismounting the car wheels, each pulley-section consisting of spaced hubs or attaching members 12, a rim or belt-engaging face 13, and spaced webs or brace portions 14 joining the companion hubs with said rim. The hubs 12 of each half section of the pulley are preferably in the form of semi-circular rings, each having a semi-circular recess or groove 15 in its inner face for receiving the corresponding attaching flange 11 of the axle, as shown in Figures 1 and 3. The bearing walls of the hub-grooves are properly finished so that the hubs fit snugly against the axle flanges and insure the pulley being centralized and in proper alinement on the axle. Extending outwardly from the hub-sections 12 and preferably in the plane of the grooves 15 are flanges 16 to which the inner edges of the semi-circular webs 14 are adapted to be secured, as by rivets 17 or other appropriate fasteners.

The companion pairs of hub-rings 12 are firmly secured to the axle by fastenings extending both lengthwise and crosswise thereof. To this end the adjoining ends of each pair of hubs terminate in coupling ears 18 which extend lengthwise of the axle and which are joined by transverse coupling bolts 19 to firmly pinch the hubs about the axle-flanges 11. The hubs are also joined to the axle flanges 11 by bolts 20 which extend lengthwise of the axle, and which serve to pull or draw and securely fasten the hubs of each half section of the pulley to said flanges. As shown in Figures 1 and 3, the inner edges 21 of the hubs are formed about such a diameter as to freely clear the axle, leaving the hubs to be supported entirely from and sustained in place by the axle-flanges.

The outer ends of the brace webs 14 of the pulley terminate in attaching flanges 22, to which the rim-sections 13 are secured, as by rivets 23 or other appropriate fasteners. The attaching flanges of the brace webs constitute an extensive bearing surface for the rim sections of the pulley and in so doing permit of shifting the rim of the pulley to one side or the other of a center line drawn between the axle-flanges, so as to permit, to a limited extent, the lining up of the axle-pulley with the companion pulley of the generator, which may or may not be in line with such center line between said axle-flanges.

In Figures 4 and 5 I have shown my invention employed in connection with a drum type of pulley 24, wherein one end of such pulley is supported in the manner as heretofore described, while the other end is supported through the medium of a pair of split hub sections 25 joined about the axle by coupling bolts 26 engaging companion ears 27 formed at the opposing ends of said hub-sections. Interposed between the axle and the hub-sections is a split tapering bushing 28, which wedges the bushing to the axle. The bushings and hub-sections are clamped together as a unit by bolts 29 engaging corresponding flanges 30 and 31 formed on the hub sections and bushing sections, respectively. Brace webs 32 connect the rim of the pulley to the hub-flanges 30.

I claim as my invention:—

1. A drive member, comprising a hub-ring, a driving rim, and a web connecting said parts, said hub-ring having an annular groove in one side thereof and an external flange off-set laterally and outwardly relatively to the grooved portion of said ring and in the plane of its groove for connecting the inner portion of the web thereto.

2. A positive driving connection between an axle and a pulley, comprising an axle having an integrally-formed, annular attaching flange thereon, and a pulley including a split hub-ring having an annular groove in one side thereof concentric with the axle-flange for engagement with the adjoining side and periphery of said axle-flange, the hub-ring having substantially radial attaching flanges at its joint edges for receiving bolts to clamp the ring about the periphery of the axle-flange, the grooved side of the hub-ring being adapted to receive bolts for fastening it to the side face of the axle-flange, said hub-ring having an annular pulley-web attaching flange disposed outwardly of and substantially in the plane of its axle-flange engaging groove.

3. A mounting of the character described, comprising an axle having axially-spaced attaching collars thereon, one of said collars being in the form of an annular flange formed integral with the axle and the other being in the form of a split sleeve surrounding but independent of the axle and having an externally tapered face, the taper thereof converging toward the companion integral collar, and complementary hub members constituting parts of a single pulley structure detachably fastened to said spaced axle-collars, one of said hub members having an annular groove in its side engageable with the opposing side and periphery of the integral axle-collar and the other hub member having a tapered sleeve engageable with the tapered face of the other axle-collar.

WILLARD F. RICHARDS.